(12) United States Patent
Beckman (10) Patent No.: US 6,911,121 B1
(45) Date of Patent: Jun. 28, 2005

(54) METHOD AND APPARATUS FOR SIMULTANEOUS HEAT AND MASS TRANSFER UTILIZING A CARRIER-GAS

(76) Inventor: James R. Beckman, 1937 E. Calle de Acros, Tempe, AZ (US) 85284

(*) Notice: Subject to any disclaimer, the term of this patent is extended or adjusted under 35 U.S.C. 154(b) by 61 days.

(21) Appl. No.: 10/031,534
(22) PCT Filed: Jul. 26, 2000
(86) PCT No.: PCT/US00/20336
  § 371 (c)(1),
  (2), (4) Date: Mar. 28, 2002
(87) PCT Pub. No.: WO01/07134
  PCT Pub. Date: Feb. 1, 2001

Related U.S. Application Data
(60) Provisional application No. 60/145,692, filed on Jul. 26, 1999.

(51) Int. Cl.$^7$ .............................. B01D 1/22; B01D 3/34; C02F 1/04
(52) U.S. Cl. .............. 203/49; 62/121; 159/13.1; 159/49; 165/115; 165/914; 165/DIG. 162; 202/236; 261/150; 261/153; 261/157
(58) Field of Search ...................... 203/10, 12, 49, 203/89, 100, 6; 202/236, 202, 185.1, 158, 177; 62/121, 119, DIG. 903; 165/111, 115, 914, 921, DIG. 162; 261/150, 153, 157, 22, 23.1; 159/13.1, 49

(56) References Cited

U.S. PATENT DOCUMENTS

| | | | |
|---|---|---|---|
| 3,788,954 A | | 1/1974 | Cantrell |
| 4,055,473 A | * | 10/1977 | Hay ............................ 202/234 |
| 4,349,415 A | * | 9/1982 | DeFilippi et al. ............. 203/14 |
| 4,350,570 A | * | 9/1982 | Maisotsenko et al. ........ 203/10 |
| 4,595,459 A | * | 6/1986 | Kusakawa et al. .......... 202/177 |
| 4,832,115 A | | 5/1989 | Albers et al. |
| 4,967,829 A | | 11/1990 | Albers et al. |
| 4,982,782 A | | 1/1991 | Albers et al. |
| 5,020,335 A | | 6/1991 | Albers et al. |
| 5,020,588 A | | 6/1991 | Albers et al. |
| 5,097,668 A | | 3/1992 | Albers et al. |
| 5,123,481 A | * | 6/1992 | Albers et al. ............... 165/111 |
| 5,290,403 A | * | 3/1994 | Saask ......................... 202/182 |

FOREIGN PATENT DOCUMENTS

| | | |
|---|---|---|
| DE | 2018726 A | 11/1971 |
| FR | 2333544 A | 7/1977 |
| WO | WO 88/06054 | 8/1988 |

* cited by examiner

Primary Examiner—Virginia Manoharan
(74) Attorney, Agent, or Firm—Schmeiser, Olsen & Watts LLP (57) ABSTRACT

The present application is directed to a continuous contacting apparatus for separating a liquid component from a liquid mixture. The apparatus comprises: (i) an evaporation chamber (15) having first and second ends, an inlet (50) and an outlet (55) for a carrier gas, and an inlet (30) and an outlet (40) for a liquid mixture, wherein the inlet (30) for the liquid mixture and the outlet (55) of the carrier gas are located on the first end of the evaporation chamber (15); (ii) a dew-formation chamber (20) having an inlet (60) and an outlet (65) for a carrier gas and an outlet for the separable liquid component (80), wherein the inlet for the carrier gas (60) of the dew-formation chamber (20) is situated in a countercurrent manner to the inlet for the carrier gas of the evaporation chamber; (iii) a common heat transfer wall (10) providing thermal communication between the evaporation chamber (15) and the dew-formation chamber (20); (iv) a feeding device for providing the liquid mixture onto the evaporation side of the heat transfer wall; (v) an air mover for controlling a flow of a carrier gas through the chambers, wherein the gas flow in the evaporation chamber is countercurrent to the gas flow in the dew-formation chamber; and (vi) a heating apparatus for heating the carrier gas from the outlet of the evaporation chamber, wherein the heated carrier gas is directed to flow into the inlet of the dew-formation chamber. Also described is a process for separating a liquid component from a liquid mixture in a continuous contacting manner comprising employing such an apparatus for such separation.

21 Claims, 8 Drawing Sheets

METHOD AND APPARATUS FOR SIMULTANEOUS HEAT AND MASS TRANSFER UTILIZING A CARRIER-GAS

CROSS REFERENCE TO RELATED APPLICATION

This application is a 371 of PCT/US00/20396, filed Jul. 26, 2000, which claims priority of U.S. provisional application Ser. No. 60/145,692 filed Jul. 26, 1999, which is incorporated by reference herein.

FEDERALLY SPONSORED RESEARCH

This project was partially funded by financial assistance provided by the United States Government through the Bureau of Reclamation, Financial Agreement Nos. 98-FC-81-0049 and 99-FC-81-0186; and the United States Government may own certain rights to this invention.

FIELD OF THE INVENTION

This invention relates to a method and apparatus for the efficient separation of: (i) liquid mixtures containing dissolved solids; or (ii) liquid mixtures, or both, wherein one or more liquid components have differing vapor pressures from the remaining components. In particular, the present invention relates to a method and apparatus for utilizing a carrier gas to separate a liquid component from a liquid mixture.

BACKGROUND OF THE INVENTION

In view of the increasing need to obtain clean water or to minimize the volume of waste waters, or both, many separation techniques have been studied and developed. One example of such a separation technique is desalination. Many technologies have been used to perform desalination, but economic factors have dictated the preferred technologies, as described in G. Fosselgard and K Wangnick, "Comprehensive Study on Capital and Operational Expenditures for Different Types of Seawater Plants" in *Desalination* 76 (1989). For example, reverse osmosis (RO) is superior for desalination of mild brackish water (e.g., less than 1000 ppm total dissolved solids (TDS)). This preference results from the fact that other technologies utilize techniques which require costly phase changes of the liquid, such as boiling a liquid into a gas. In contrast, RO employs low-pressure pumps (less than 100 psi) to force water through semi-permeable membranes, thereby consuming less energy than a boiling process.

However, RO is ineffective in purifying water containing non-filterable suspended particulates. For example, the process of chemical mechanical polishing (CMP) used by the silicon industry discharges an aqueous slurry containing about 15% by weight of aluminum oxide particles. Being less than about 1 micron in size, these particles are non-filterable and readily foul RO membranes, as described in Cabot Corporation's product information for "Semi-Sperse®12: Polishing Slurry for Interlayer Dielectric Oxide CMP" (July 1995). As a result, the CMP slurries are typically discharged to the environment, which has been historically less costly then investing in low capacity thermal technologies. Still another example is the purification of river water. Many rivers, such as the Colorado River, contain silt in the 1 micron range which can foul RO membranes, thereby increasing the maintenance and/or pretreatment costs of RO operations.

For the more TDS intense aqueous applications, such as waste water streams and sea water, other mechanical and thermal technologies economically compete with RO, as described in Larson et al., "The Carrier-Gas Process: A New Desalination and Concentration Technology" in *Desalination,* 73, p. 119 (1989), and Larson, et al., "The Carrier-Gas Process: A New Desalination and Concentration Technology" in *Proceedings of the Fourth World Congress of Desalination and Water Reuse*, Kuwait (November 1989). In sea water desalination, for example, the RO pump pressures increase to 1000 psi. Furthermore, feed waters require expensive pre-treatments in order to protect and extend the life of the membranes.

Technologies in competition with RO for seawater desalination include mechanical vapor compression (MVC), multi-stage flash distillation (MSF), and multi-effect distillation (ME) with and without thermal vapor compression. MVC technology requires shaft power to drive its compressor. The motor can be either electrically or thermally driven. Unfortunately, electrically driven MVC plants consume more electricity than RO units for sea water desalination. The thermally driven processes (NSF and ME) use heat to provide a temperature-diving force at different stages of boiling and condensing and at various stages of pressures. Thus, the thermally driven plants attempt to reuse the high temperature from the applied heat as many times as is economically possible in order to minimize operating costs. This energy reuse factor economically varies from 6 to 12. The energy reuse factor is also referred to as the gain output ration (GOR). As the GOR increases so does the equipment capital cost. The optimum GOR value depends upon typical cost variables, such as plant capacity, cost of energy, cost of materials, etc.

One attempt to overcome these problems involved the use of simultaneous heat and mass transfer in stages utilizing a carrier gas. In such a staged apparatus, the liquid is sprayed onto each side of a heat transfer wall to obtain enhanced heat and mass transfer coefficients and reduce the required surface area of the heat transfer wall. This technique allowed the film gas heat transfer coefficients to be in the range of about 100 to 300 $W/m^{2°}$ C., which resulted in condensate production fluxes in the range of about 2.3 to about 6.8 kg of condensate per hour/$m^2$ of heat transfer wall. Since spraying the liquid is essential to maintaining the enhanced heat transfer coefficients, pumps were needed to force the liquid through spray nozzles. However, a staged configuration was required to limit the mixing by the pumps of the liquid compositions and temperatures at different locations of the apparatus. As a result, each stage required a dedicated pump and nozzle, and about 50 to 100 stages were required to achieve GOR values of about 10 to 20. Since each side of the heat transfer wall had to be wetted, this meant that the total number of pumps and nozzles required was from about 100 to about 200. Accordingly, the increased complexity of these apparatus was detrimental to economic and reliable operation.

One of the objects of this invention is, therefore, to provide a process and apparatus for separation of a liquid component from a liquid mixture. Another object of the present invention is to provide a separation process and apparatus that is inexpensive in capital and operational costs relative to currently known separation processes and equipment.

SUMMARY OF THE INVENTION

This invention relates to a continuous contacting apparatus for separating a liquid component from a liquid mixture. The apparatus comprises: (i) an evaporation chamber having first and second ends, an inlet and an outlet for a carrier gas, and an inlet and an outlet for a liquid mixture, wherein the inlet for the liquid mixture and the outlet of the carrier gas are located on the first end of the evaporation chamber; (ii) a dew-formation chamber having an inlet and an outlet for a carrier gas and an outlet for the separable liquid component, wherein the inlet for the carrier gas of the dew-formation chamber is situated in a countercurrent manner to the inlet for the carrier gas of the evaporation chamber; and (iii) a common heat transfer wall capable of providing thermal communication between the evaporation chamber and the dew-formation chamber. The apparatus can further comprise: a feeding device for providing the liquid mixture onto the evaporation side of the heat transfer wall; an air mover for providing a flow of a carrier gas through the chambers, wherein the gas flow in the evaporation chamber is predominantly countercurrent to the gas flow in the dew-formation chamber; and a heating apparatus for heating the carrier gas from the outlet of the evaporation chamber, wherein the heated carrier gas is directed to flow into the inlet of the dew-formation chamber. The feeding device can be any device that allows feeding of the liquid mixture to the apparatus. Nonlimiting examples include a pump, and a liquid mixture tank placed above the apparatus to allow gravity feeding of the liquid mixture into the apparatus. Heat from condensation of the separable component in the dew-formation chamber is communicated across the heat transfer wall, to allow the separable component to evaporate into the carrier gas in the evaporation chamber. Thermal communication, as used herein, means that heat can flow between the communicating components.

In another embodiment of the present invention, the apparatus further includes a wetting material placed on top of the evaporation side of the heat transfer wall. In various other embodiments, the heating apparatus can be any of the following: (i) a boiler, which provides steam to the carrier gas; (ii) a heat exchanger, wherein steam from a boiler is brought into thermal communication with the carrier gas; (iii) a desiccant/heat exchanger, wherein a slip stream is taken from the carrier gas and reacted with a desiccant and the heat produced by the reaction is thermally communicated to the remainder of the carrier gas; and (iv) a liquid/contactor, wherein a reactant reacts with the carrier gas, thereby increasing the concentration of the water vapor in the remaining carrier gas.

This invention also relates to a process for separating a liquid component from a liquid mixture in a continuous contacting manner. This process comprises: (i) contacting the liquid mixture with an evaporation side of a heat transfer wall; (ii) flowing a carrier gas across the evaporation side of a heat transfer wall to provide a carrier gas saturated with the separable liquid component; (iii) heating the saturated carrier gas; and (iv) flowing the heated saturated carrier gas across a dew-formation side of a heat transfer wall to provide condensation of the separable liquid component from the heated saturated carrier gas. The heat obtained from the dew-formation is thermally communicated from the dew-formation side to the evaporation side the heat transfer wall to provide the heat necessary for evaporation of the separable component into the carrier gas.

BRIEF DESCRIPTION OF THE DRAWINGS

Further objects and advantages of the present invention will be more fully appreciated from a reading of the detailed description when considered with the accompanying drawings, wherein.

DETAILED DESCRIPTION OF THE INVENTION

The technology of Dewvaporation can be used to efficiently separate (e.g., concentrate, purify, fractionate, or strip) a liquid component from a liquid mixture using a carrier gas. The term "Dewvaporation," as used herein, means that a liquid component is efficiently separated by first causing it to form a vapor (vaporization) and then causing it to condense (dew formation). The term "liquid mixture," as used herein, means (i) liquids containing dissolved solids; or (ii) liquids having one or more liquid components with differing vapor pressures from the remaining components in the liquid mixture, or both. The separable component is the liquid that can be separated by evaporation. Dewvaporation efficiently combines the processes of humidification and dehumidification by using a carrier-gas (e.g., air) to evaporate a liquid component (e.g., water) from a liquid mixture and then forming dew or pure condensate from the saturated carrier-gas at fairly constant pressure (e.g., atmospheric).

The continuous contacting Dewvaporation apparatus of the present invention includes an evaporation chamber and a dew formation chamber, which are separated by a common heat transfer wall. The term "continuous contacting," as used herein, means that the liquid mixture is maintained in continuous contact with the heat transfer wall and a carrier gas after being fed, e.g., without the need for re-applying the liquid mixture onto a portion or sector of the heat transfer wall after the liquid mixture is initially placed onto the heat transfer wall. Furthermore, the movement of the liquid and the gas is not interrupted by mixing of the liquids ahead or behind a particular length of the apparatus, e.g., mixing within a particular stage. The continuous contacting apparatus of the present invention, therefore, only requires one pump to feed the liquid mixture, and does not require a plurality of pumps and nozzles for a plurality of stages. The instant apparatus utilizes slot flow to generate smaller gas film heat transfer coefficients of less than about 50 W/m$^{2\circ}$ C., preferably about 5 W/m$^{2\circ}$ C., which result in condensate production fluxes from about 0.045 to about 2.27 kg of condensate per hour/m$^2$ of heat transfer wall, preferably from about 0.23 to about 0.91 kg of condensate per hour/m$^2$ of heat transfer wall. The term "about," as used herein, means ±10% of the stated value.

Once the liquid mixture is fed onto the evaporation side of the heat transfer wall, the separable liquid component is evaporated into a carrier gas. The heat needed for evaporation is supplied by the heat released from the dew fall condensation, i.e., formation of dew from the vapor, of the separable component onto the opposite side of a heat transfer wall from the carrier gas. Virtually any external heat source can be used to provide the necessary heat because: (1) only a small amount of external heat is needed to establish temperature differences across the wall at any given height of the column; and (2) the temperature of the external heat is versatile.

Figure 1:
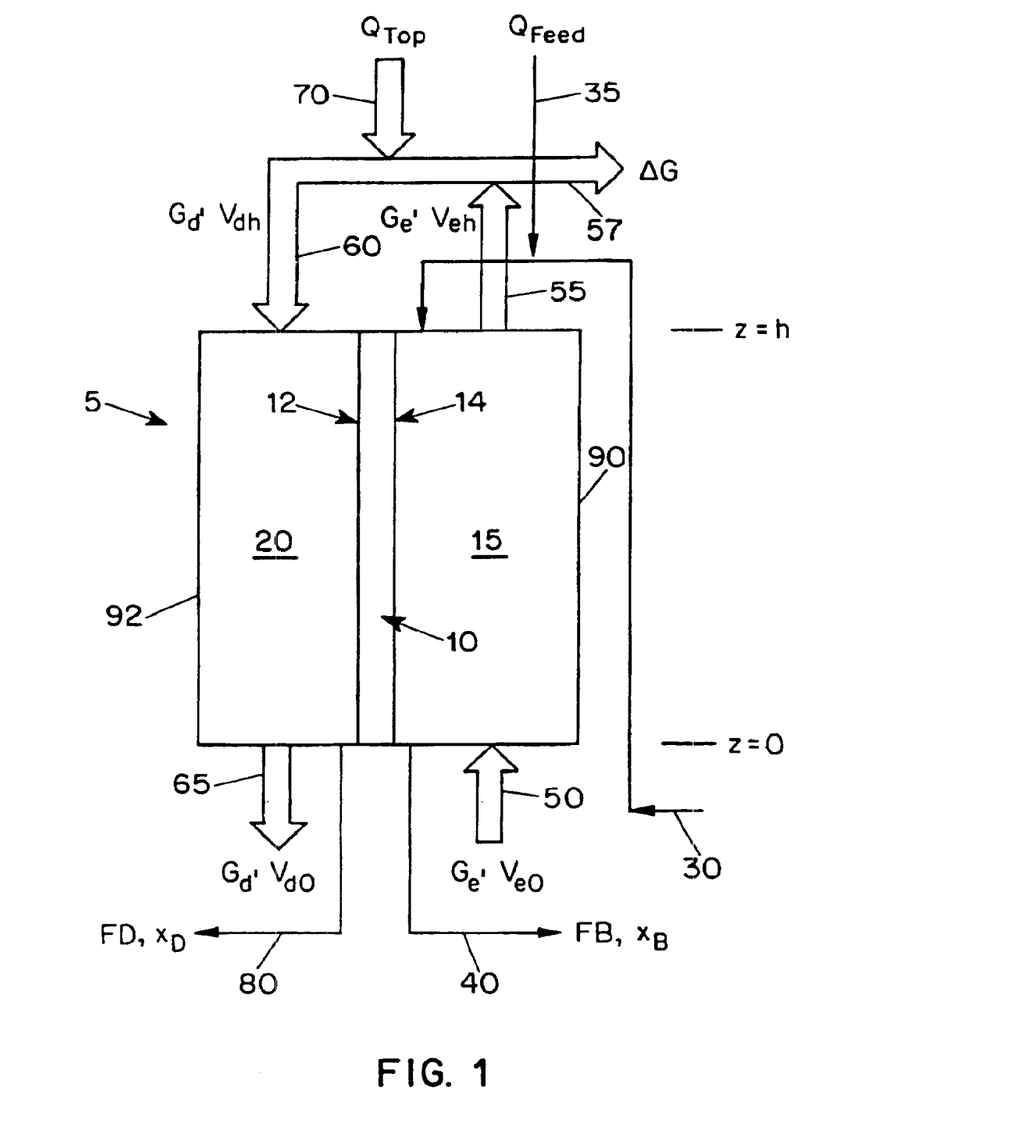
FIG. 1 is a schematic of one embodiment of the present invention.

As illustrated by FIG. 1, one embodiment of the present invention is a continuous contacting column 5 that includes a heat transfer wall 10 which separates two vertically extending portions of the column: (i) an evaporation portion of the column 15 (evaporation chamber), i.e., the portion of the column where the separable component is evaporated from the liquid mixture into a carrier gas, and (ii) a dew-formation portion of the column 20 (dew-formation chamber), i.e., the portion of the column where the separable component in the carrier gas is condensed into dew. The liquid mixture feed 30 is introduced into the top of the evaporation portion so that the liquid mixture is in physical contact with the evaporation side 14 of the heat transfer wall 10, and the brine 40, i.e., the remaining concentrated liquid mixture, exits at the bottom of the evaporation portion of the column. Preferably, the liquid mixture feed is introduced at a rate so that the liquid mixture flows down the heat transfer wall in a thin layer, thereby enhancing vaporization of the separable component into the carrier gas as heat is received from the dew-formation portion of the column across the heat transfer wall. The carrier gas 50 is introduced at the bottom of the evaporation portion of the column 15, and the saturated carrier gas 55, i.e., containing the separable liquid component, exits the top of the evaporation portion of the column 15. A minor portion 57 (e.g., less than about 15% by volume) of the saturated carrier gas can be used to pre-heat the liquid mixture feed by heat exchange or direct contact. Alternatively, heat (indicated as $Q_{Feed}$ stream 35) can be added to the feed liquid mixture 30.

After adding heat (Q) 70, the heated saturated carrier gas 60 is introduced into the top of the dew-formation portion of the column 20. Any additional amount of heat is sufficient, e.g., even to increase the temperature of the saturated carrier gas less than 1° C., as long as the saturated carrier gas is hotter at the inlet to the dew-formation side than the outlet from the evaporation side. The additional heat can be obtained from virtually any source, e.g., low temperature solar heat, waste heat, or heat from combustible fuels. In one embodiment, the additional heat is provided by the addition of steam.

Without wanting to be limited by any one theory, it is believed that the additional heat provides a temperature gradient on the dew-formation side of the heat exchange wall 12 that is higher (e.g. starting at a higher temperature) than the temperature gradient on the evaporation side of the heat exchange wall 14. As used herein, temperature gradient means that, for a given side of the column, the highest temperature is at the top of the column and the lowest temperature is at the bottom of the column with incremental temperature differences in between. Thus, at any given height or length of the column, the average temperature on the dew-formation portion of the column 20 is greater than the average temperature on the evaporation portion of the column 15. The additional amount of heat 70 and the flow rate of the carrier gas is chosen to optimize: (i) evaporation of the separable liquid component in the evaporation portion of the column 15; and (ii) condensation of the separable liquid component in the dew-formation portion of the column 20. Preferably, the gas phase and the liquid phase are close to equilibrium conditions. Thus, it is preferable to have the dew point temperature within the temperature gradient of the dew-formation portion of the column 20, and the temperature at a desired vapor pressure of the separable component within the temperature gradient of the evaporation portion of the column 15. Further heat and mass transfer principles, variables, and equations are described in Bird et al., *Transport Phenomena*, (John Wiley and Sons 1960) and are well understood by those skilled in the mass/heat transfer arts.

The heated, saturated carrier gas 60 is forced down the dew-formation portion of the column 20 by a carrier gas mover (not shown). The carrier gas mover can be any apparatus known in the art that creates positive pressure to move the carrier gas in a particular direction. Nonlimiting examples of useful carrier gas movers include fans, turbines, pumps, and vacuums. The carrier gas mover can be placed at one or more of the inlets and outlets of the dew-formation and evaporation portions of the column. As the heated, saturated carrier gas 60 moves down the dew-formation portion of the column 20, heat is transferred across the heat transfer wall 10 to the evaporation portion of the column 15. As a result, the separable liquid component naturally condenses on the dew-formation side of the heat transfer wall 12. The condensate containing the separable liquid component is then collected at the bottom or outlet of the heat transfer wall of the dew-formation portion of the column 20 and pumped out as the distillate 80. The remaining saturated carrier gas 65 also exits at the bottom of the dew-formation portion of the column. Preferably, the saturated gas exits away from the separated liquid component, i.e., is not bubbled through the distillate. The carrier gas 65 may be discarded or recycled in part or in whole to feed carrier gas stream 50.

The heat transfer wall 10 can be made of any thermally conductive material or mixtures of these materials. Preferred are gas and liquid impermeable materials that are stable when placed in contact with the liquid mixture, e.g., will not be susceptible to corrosion, rust, pitting, or fouling. Examples of useful heat transfer wall materials include, but are not limited to, plastics, such as polyethylene, polypropylene, polyester, polycarbonate, polymers containing a combination of any of the monomers thereof, and mixtures thereof; metals, such as stainless steel (e.g., types 304, 316, and 347), brass, copper, platinum, silver, and alloys thereof; and composites, such as carbon fiber composites, fiber glass, and waxed paper.

Preferably, the heat transfer wall is wettable, which means that the liquid mixture feed flows in a thin liquid layer down the wall so that beading of the liquid mixture is not promoted. Thus, it is preferred to have a hydrophobic heat transfer wall for a hydrophobic liquid mixture, and a hydrophilic heat transfer wall for a hydrophilic liquid mixture. Nonlimiting examples of such heat transfer materials include water wettable plastic materials, such as Rexam M3D (commercially available from Rexam Graphics Company, located in South Hadley, Mass.); and durable plastics, such as the many Mylar films, which are commercially available from E.I. Dupont de Nemours Co. In an alternative embodiment, a thin layer of a wetting material can be placed upon any of the heat transfer materials described above. Nonlimiting examples of wetting materials include polyester gauze, cloth gauze, polypropylene cheesecloth, nylon cheesecloth, polypropylene/nylon cheesecloth, blends of these materials, and other fibrous materials. Many types of cheesecloths and gauzes are commercially available from ERC Wiping Products, Inc. located in Lynn, Mass. and from Carnegie Textiles located in Cincinnati, Ohio.

The remainder of the Dewvaporation apparatus, e.g., the outer walls 90 and 92, can be made of any gas and liquid impermeable material known in the art. Except for the preference for being water wettable, the materials recited above for use in the heat transfer wall can be used for the remainder of the Dewvaporation apparatus. If low strength materials, such as plastics are used, collapse of either or both chambers (e.g., the dew-formation portion 20 or the evaporation portion 15) of the Dewvaporation apparatus can be a concern. For example, if the air mover is placed at the outlet of the dew-formation portion 20 of the column, the slightly negative pressure created therein can cause a collapse or a inward-warping of the plastic outer wall 92 and heat transfer wall 10. Such a collapse can be prevented by employing any method known in the art, such as placing spacers or fins at various locations throughout the length of the chamber or filling the chamber with a filler. Preferably the filler is made of a high volume gas/air permeable material. A nonlimiting example of a useful gas/air permeable material is T-15 MR reticulated foam, commercially available from Crest Foam Industries located in Moonachie, N.J.

Figure 2:
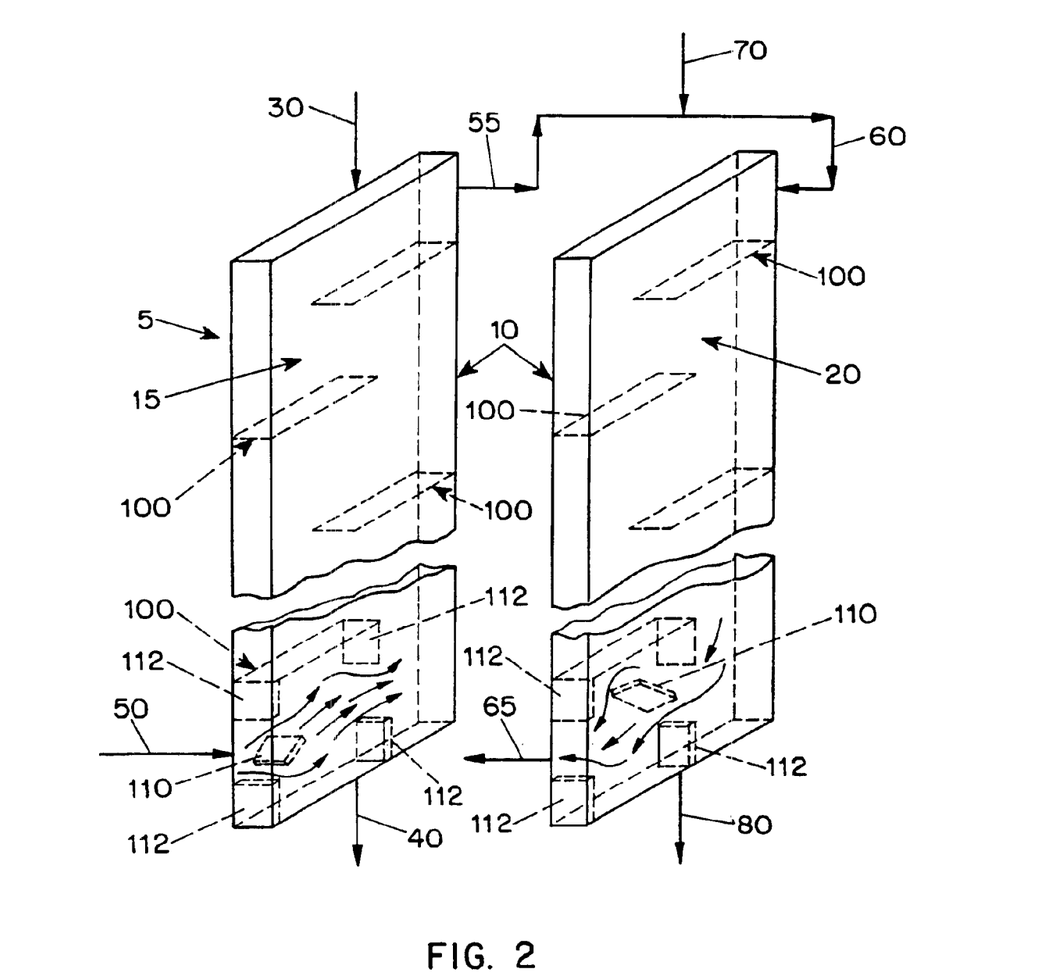
FIG. 2 is a schematic of another embodiment of the present invention.

In another embodiment of the present invention, as illustrated by FIG. 2, the evaporation 15 and dew-formation 20 portions of the Dewvaporation apparatus can also be configured to have a plurality of spacers 100, which are preferably placed at the same positions in both the evaporation 15 and dew-formation 20 portions of the Dewvaporation apparatus. Without wanting to be limited by any one theory, it is believed that the resulting "serpentine" air flow pattern provides better distribution of air flow for a given surface area of the heat transfer wall as a result of the decrease in channel width. Accordingly, the resulting channels and air flow rates can provide typical Reynolds Numbers of from about 100 to about 2500, preferably about 500 at the inlet of either portions of the Dewvaporation apparatus and from about 50 to about 200, preferably about 150 at the outlet of either portions of the Dewvaporation apparatus. The spacers can be made of any material that is stable when placed in contact with the liquid mixture 30, 40 or distillate 80, e.g., a material that is not susceptible to corrosion, rust, pitting, or fouling. Preferably, the spacers are made of water permeable materials so that the liquid can flow down the heat transfer wall and can be redistributed on the wall as it passes through the spacers. Nonlimiting examples of useful materials for spacers include plastic sponges, commercially available as A132C5G Ester urethane/charcoal color foam from Merryweather Foam Inc. located in Barberton, Ohio.

In this embodiment, it is preferable to also include airflow guides 110 and 112 in the path of the carrier gas to better match the countercurrent airflow pattern on each side of the heat transfer wall. These airflow guides can be positioned in any orientation (e.g., horizontal, vertical, as depicted by guides 112, and at any angle in between) and can be formed into any shape (e.g., straight or curved) that would optimize the coincidence of the airflow in the dew-formation chamber and the evaporation chamber at any point in the apparatus. Vertically placed airflow guides 112 help to direct the carrier gas flow in the center of the passage. Airflow guides place in an angle 110 help to evenly distribute the gas within the passage. These airflow guides can be made of any stable material including the same materials used for the spacers described above. If the airflow guides are made of water impermeable material, however, it is preferred to attach the airflow guides to the outer wall of the apparatus and provide sufficient space between the airflow guide and the heat transfer wall to allow continuous flow of the liquid thereon.

Referring back to FIG. 1, one typical embodiment of the Dewvaporation apparatus brings air at a wet bulb temperature of about 23.9° C. containing about 0.03 moles of water vapor per mole of air. As the air rises in the evaporation portion of the apparatus 15 (evaporation chamber), the air heats and evaporates the separable component from the feed 30 using the latent heat of condensation from the dew-formation portion of the apparatus 20 (dew-formation chamber) that is transferred through the heat transfer wall 10. The saturated air 55 leaves the outlet of the evaporation chamber at a temperature of about 87.8° C. containing about 1.7 moles of water vapor/mole of air. The saturated carrier gas 55 is then heated by adding steam 70 to provide a heated, saturated carrier gas 60 at a temperature of about 88.3° C. containing about 1.8 moles of water vapor/mole of air. The heated, saturated carrier gas 60 is then introduced into the inlet of the dew-formation portion 20 of the apparatus and the remaining saturated carrier gas 65 exits the outlet of the dew-formation chamber at a temperature of about 50° C. containing about 0.13 moles of water vapor/mole of air.

Figure 3A:
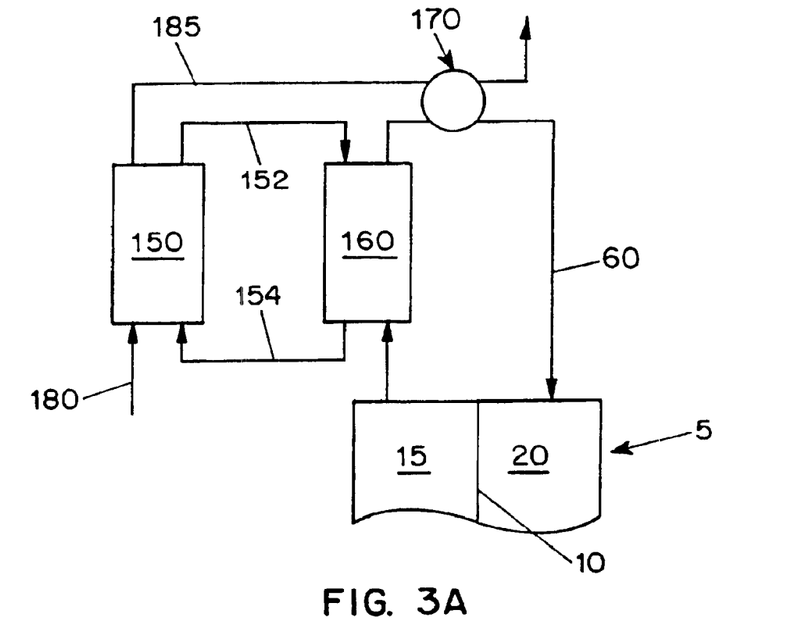
FIG. 3A is a schematic of one embodiment for a heating apparatus of the present invention.
Figure 3B:
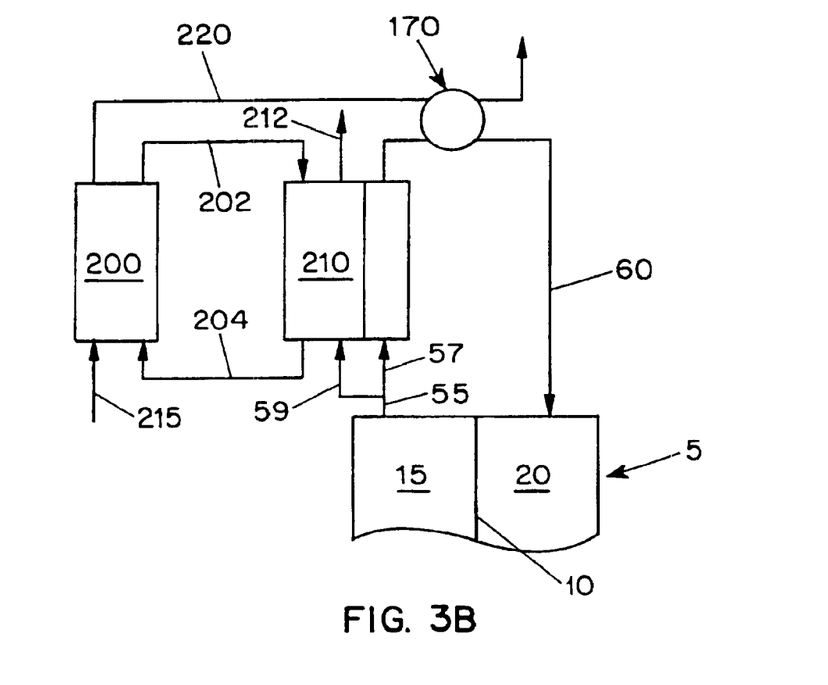
FIG. 3B is a schematic of another embodiment for a heating apparatus of the present invention.
Figure 3C:
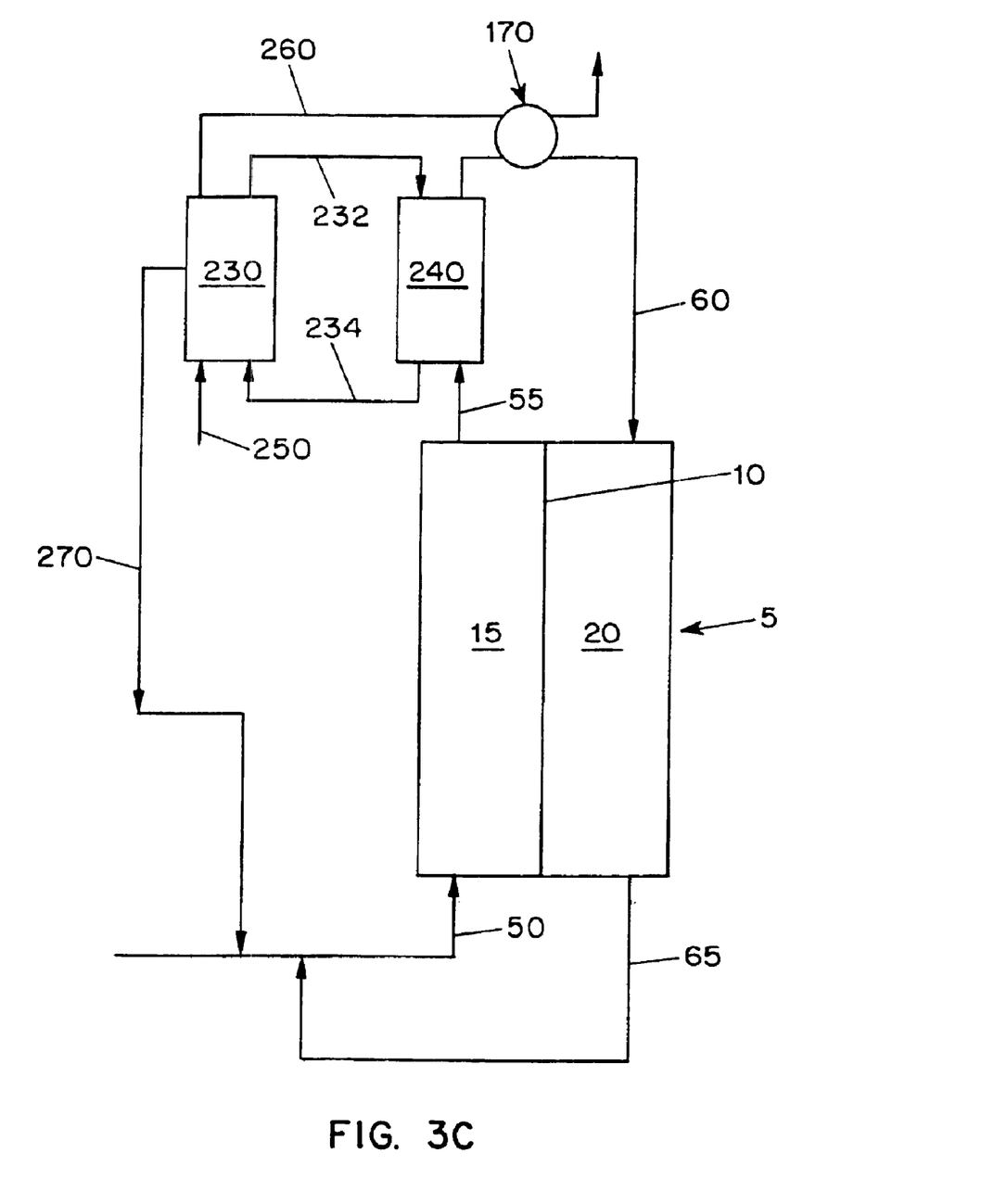
FIG. 3C is a schematic of another embodiment for a heating apparatus of the present invention.

FIGS. 3A, 3B and 3C provide alternative embodiments for heating the saturated carrier gas 55. In reference to FIG. 3A, the saturated carrier gas 55 is heated by an air/water contactor 160, which is capable of providing the necessary heat. Hot water 152 at a temperature of about 96.1° C. is supplied to the air/water contactor from a water heater 150, and the cooled water stream 154 at a temperature of about 90.6° C. is recycled back from the air/water contactor 160 to the water heater 150. The water heater can be heated by any conventional fuel and/or by solar energy, since only a small amount of heat is required to maintain the temperatures, e.g., about 7 therms/day for a 1000 gallon/day (4 cubic meters/day) desalination unit. If a conventional fuel such as natural gas is used, the waste heat can be recovered in stream 185 and utilized to further heat the heated saturated carrier gas in heat exchanger 170.

In an alternative embodiment as illustrated by FIG. 3B, heat is supplied to the saturated carrier gas 55 by a desiccant technique. A slip stream 59 is taken from saturated carrier gas stream 55 and contacted with a fresh liquid desiccant stream 202 in desiccator/heat exchanger 210, which includes a gas/liquid contactor. The slip stream 59 is less than about 40%, preferably less than about 20%, more preferably less than about 15%, and most preferably less than about 10% by volume of the saturated carrier gas stream 55. As water vapor is absorbed from the slip stream 59, latent heat is released and heat exchanged with the remaining saturated carrier gas stream 57. This extra heat can be used to allow an equal amount of liquid water (e.g., water obtained from regenerating the desiccant) to evaporate into the remaining saturated carrier gas stream 57, thereby increasing the water vapor content to about 1.8 moles of water vapor/mole of air. The de-humidified slip stream 212 can then be added to the feed carrier gas 50 in FIG. 1.

The spent desiccant stream 204 is recycled back to a desiccant regenerator 200, which removes the absorbed water and provides fresh desiccant in stream 202. This liberated water vapor or steam can be supplied (not shown) to the heated saturated carrier gas stream 57, as described above in a preceding paragraph. The regenerator typically can use from about 1.2 to about 4 therms/day of heat for a 1000 gallon/day (4 cubic meters/day) desalination unit, which can be provided by any conventional fuel and/or by solar energy. If a conventional fuel such as natural gas 215 is used, the waste heat can be recovered in stream 220 and utilized to further heat the heated saturated carrier gas in heat exchanger 170. The desiccant can be a liquid solution of any known desiccant salt at a concentration of greater than about 40%, preferably greater than about 50%, and more preferably greater than about 60% by weight. Examples of useful desiccant salts include, but are not limited to, lithium bromide (10% maximum relative humidity producing), calcium chloride (30% maximum relative humidity producing), lithium chloride (20% maximum relative humidity producing), and mixtures thereof. The term "% maximum relative humidity producing," as used herein, means the maximum dryness that a desiccant can provide to an air stream. For example, a 10% maximum relative humidity producing desiccant can dehydrate a saturated air stream at 87.8° C. containing about 1.7 moles of water vapor/mole of air to 0.067 moles of water vapor/mole of air at the same temperature. A solid desiccant can also be used to provide the desired dehydration. Nonlimiting examples of solid desiccants include solids of any of the above-described liquid desiccants, silica gel, and mixtures thereof. If a solid desiccant is used, however, a removable or moving bed configuration would be used to replace the spent solid desiccant.

In still another embodiment, heat is supplied to the saturated carrier gas by a reactive carrier gas technique. This technique utilizes a carrier gas having all or a component that can be removed when exposed to an absorbent or reactant, thereby increasing the concentration of the water vapor from about 1.7 moles to about 1.8 moles of water vapor/mole of carrier gas. The absorbent or reactant is preferably chosen so that it can be regenerated. The effective increase in water vapor concentration in the remaining carrier gas provides an increase in temperature as a result of supersaturation of remaining carrier gas. A nonlimiting example of a reactive carrier gas/reactant pair is carbon dioxide and potassium carbonate solution, which can remove about 5% of the total carbon dioxide from a carrier gas. The reactant/absorbent is provided in liquid solution at a concentration of more than about 30%, preferably more than about 40%, and more preferably more than about 50% by weight of the liquid. Nonlimiting examples of other carrier gas/reactant pairs include carbon dioxide and monoethanol amine (MEA); butane and oil; sulfur dioxide and MEA; carbon monoxide and copper ammonia acetate.

In one embodiment of the reactive carrier gas technique, as illustrated by FIG. 3C, fresh potassium carbonate solution 232 is reacted with the saturated carrier gas 55 in a liquid/gas contactor 240. After reacting with the carbon dioxide in the carrier gas, the reacted potassium bicarbonate 234 is then regenerated into fresh potassium carbonate 232 in regenerator 230. Typically, heat can be used to regenerate potassium carbonate from potassium bicarbonate by removing carbon dioxide. The evolved carbon dioxide 270 can then be heat exchanged with any other cooler stream and/or recycled back into the feed carrier gas 50. If all of the carrier gas is carbon dioxide, the carrier gas 65 from the outlet of the dew-formation chamber 20 can also be recycled into the feed carrier gas 50, thereby conserving as much of the reactive carrier gas as possible. The regenerator typically can use from about 1.2 to about 4 therms/day of heat for a 1000 gallon/day (4 cubic meters/day) desalination unit, which can be provided by any conventional fuel and/or by solar energy. If a conventional fuel such as natural gas 250 is used, the waste heat can be recovered in stream 260 and utilized to further heat the heated saturated carrier gas in heat exchanger 170.

Optimum recovery of the separable component from the liquid mixture is obtained when the viscosity of the liquid mixture is maintained below about 4 cP, preferably below about 1 cP. Preventing high viscosities (e.g., gel formation) reduces fouling of the heat transfer wall. Such inefficiencies can be avoided by the addition of an anti-gellant or anti-flocculant to liquid mixture feed 30 in FIG. 1. Nonlimiting examples of useful anti-gellants or anti-flocculants include polyvinyl alcohol (PVA), carboxymethyl cellulose, and mixtures thereof.

Further apparatus and methods to optimize performance of the Dewvaporation apparatus are well known in the art of heat/mass transfer, as described in McCabe et al., *Unit Operations of Chemical Engineering*, 4$^{th}$ Ed. (McGraw-Hill 1985). For example, the liquid mixture feed can be preheated by undergoing heat exchange with any higher temperature stream. Preferably, the liquid mixture feed is heat exchanged with the exiting condensate stream and/or the exiting saturated carrier gas stream. In another example, the Dewvaporation apparatus described herein, can be positioned vertically, as illustrated by FIG. 1, horizontally, or in any position in between, e.g., at a 45 degree angle. Furthermore, two or more Dewvaporation apparatus can be run in series or in parallel, with appropriate connections, as will be well understood by those skilled in the art.

The humidification-dehumidification process of the present invention focuses on the economic "best" niches for desalination. A potential niche fit of the Dewvaporation technology could be reducing the volume of reject saline waters by an order of magnitude from RO plants, such as the Yuma facility for Colorado River desalination, and small seawater desalination applications. The detrimental desiccant factor ($F_{RH}$), i.e., the detrimental effect of salt concentration on the energy reuse factor or gain output ratio (f), is approximated by equation 1:

$$F_{RH} = 1 - (1-RH) \cdot (1+f) \cdot (1+V_{eh}) \quad (1)$$

wherein RH is the relative humidity (fraction) and $V_{eh}$ is the moles of water vapor per moles of carrier gas. Nomenclature for all variables discussed herein are provided below in the Example section.

The Dewvaporation continuous contacting tower focuses on a novel and innovative heat driven process using air as a carrier-gas, wherein the process is maintained at atmospheric pressure throughout the device. The heat source can be from low temperature solar (55° C.), waste heat, or combustible heat (99° C.). The process works in the following manner for desalination of brackish water and sea water, as respectively illustrated in FIGS. 4A and 4B. V corresponds to the moles of water vapor per moles of carrier gas, wherein the subscripts have the following meaning: e means on the evaporation side of the column; d means on the dew-formation side of the column; h means the height at the top of the column; and 0 means the height at the bottom of the column. A carrier-gas 50, such as air, is brought into the bottom of the tower on the evaporation side 15 of a heat transfer wall 10 at a wet bulb temperature typically of about 21° C. and containing about 0.025 moles of water vapor per mole of air. The wall is wetted by saline feed water, which is fed onto the evaporation side of the heat transfer wall at the top of the tower. As the air moves from the bottom to the top of the tower, heat is transferred into the evaporation side through the heat transfer wall, thereby allowing the temperature of the saline feed and the carrier-gas to rise and evaporate water from the wetting saline liquid which coats the heat transfer wall. A concentrated liquid mixture leaves the bottom of the tower from the evaporation chamber 15 and hot saturated air 55 leaves the top of the tower at about 87.4° C. with a humidity of about 1.71 moles of water vapor per mole of air. Heat is added to this hot air by an external heat source (e.g., steam) 70 increasing the air humidity to a V of about 1.81 and a temperature of about 87.9° C. This now hotter saturated air 60 is sent back into the top of the tower on the dew formation side 20. Being slightly hotter than the evaporation side, the dew formation side of the tower allows the air to cool and transfer condensation heat from the dew formation side of the heat transfer wall to the evaporation side of the heat transfer wall. Finally, pure water condensate and partially saturated air 65 leave the bottom of the dew formation side of the tower at 48.7° C. Total external heat needed is made up of the heat needed at the top to establish a heat transfer temperature difference and the heat needed to establish a temperature off-set between the saline feed stock and the pure water condensate.

The product of the energy reuse factor, f, and the production flux, $P_f$, (mass rate of condensate production per area of heat transfer wall) is related to the maximum vapor content of the air. The value of the constant that relates the $f \cdot P_f$ to absolute humidity is composed of the properties of water vapor and the gas film heat transfer coefficient. Analysis of the heat transfer resistances shows that the air film is the major resistance when compared to the others such as the falling liquid films and the plastic film heat transfer wall. Enhancement of the heat and mass transfer coefficients on the wetted heat transfer wall is a main focus of the future research. Further mass transfer principles and variables are described, for example, in Bird et al., *Transport Phenomena*, (John Wiley and Sons 1960).

The Dewvaporation apparatus may be constructed of thin water wettable plastics and operated at pressure drops of less than 0.2 inches of water. The projected capital cost for a 1000 gallon per day unit has been estimated at $2,064 which includes hot water heater, four pumps, one air fan (pumps and fan require 0.4 kW of electricity) and a manufacturers gross margin of 25%. Totally inclusive operating cost would be less than $1.5 per cubic meter of condensate. Thus, the Dewvaporation process appears to be commercially advantageous for the desalination of saline waters in comparison to other technologies, such as reverse osmosis (RO) of waste streams and sea water level compositions.

The mathematical definition of the energy reuse factor, f, is the ratio of the energy transferred through the heat transfer wall to the high temperature energy input as shown in equation 2:

$$f = \frac{V_{dh} - V_{d0}}{V_{dh} - V_{eh}} \tag{2}$$

The definition of the molar production flux, $P_f$ is the gas traffic (G) times the water vapor decrease of the dew formation side of the wall divided by the wall area (A) as shown in equation 3:

$$P_f = \frac{G}{A} \cdot (V_{dh} - V_{d0}) \tag{3}$$

Figure 4A:
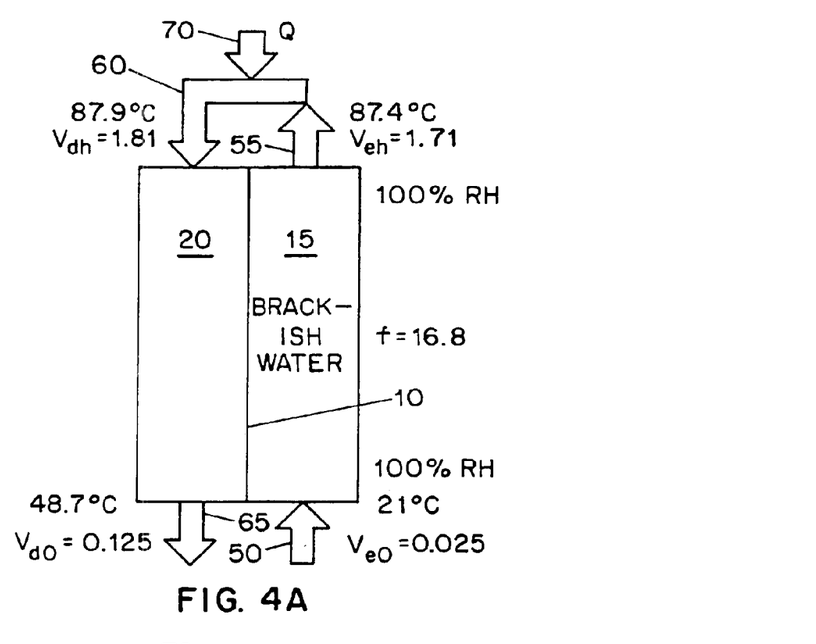
FIG. 4A is a schematic of separating water from brackish water in one. embodiment of the present invention.
Figure 4B:
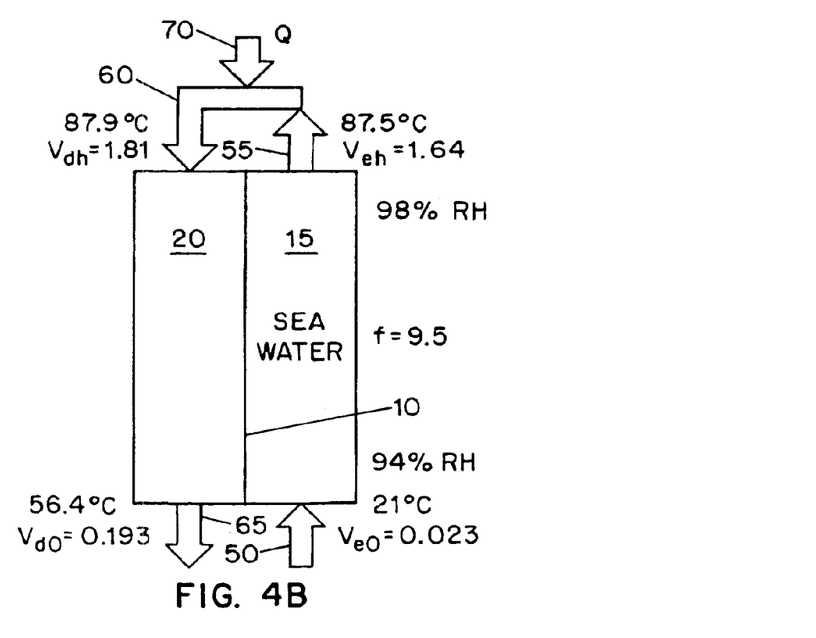
FIG. 4B is a schematic of separating water from sea water in one embodiment of the present invention.

Typically, the feed/condensate temperature offset is kept to 5.5° C. This can be accomplished by either an internal or external feed heat exchanger. In this analysis an energy reuse factor, f, was 16.8, as illustrated in FIG. 4A. By including the heat needed for the temperature offset, the f reduces to about 13. Actually, the product of the f and the molar production flux, $P_f$, is a constant at parametric $V_{eh}$. The value of the constant is a function of the operating variables as shown in the following equations.

The amount of water vapor contained in the air carrier-gas is calculated by specifying the temperature, T, and calculating the vapor pressure, P°, from equation 4, as provided in Smith and Van Ness, *Introduction to Chemical Engineering Thermodynamics*, 4th ed. McGraw-Hill, Inc. (1987).

$$\ln P° = B - \frac{\lambda}{R \cdot T} \tag{4}$$

where B and λ are constants obtained by fitting a straight line to the lnP° versus 1/T for the steam table. For a temperature range of 273.15° K to 373.15° K, B is 14 and λ/R is 5209 K, as provided in Perry et al., *Perry's Chemical Engineers' Handbook*, McGraw-Hill, Inc. (1984). The moles of water vapor per mole of air is then:

$$V = \frac{RH \cdot P°}{P - RH \cdot P°} \tag{5}$$

where the relative humidity (RH) is given as a function of salinity (S) by the following equation, as provided in Spiegler and Laird, *Principles of Desalination: Part B*, 2nd ed. Academic Press (1980):

$$RH = 1 - 0.000538 \cdot S \tag{6}$$

The hottest temperature in the evaporating section is specified allowing the calculation of the largest value of the $V_{eh}$ in the evaporating section of the unit. Then the change in vapor content of the carrier-gas is specified across the top of the tower by:

$$\Delta V = V_{dh} - V_{eh} \tag{7}$$

From these specifications, the temperature difference across the heat transfer wall at any position can be described as:

$$\frac{1}{\Delta T_{LM|z}} = \left[\frac{B^2 \cdot R}{\lambda}\right] \cdot \left[\frac{(1 + \Delta V + V_e|_z) \cdot V_e|_z}{\Delta V}\right] \tag{8}$$

wherein the subscript LM means log mean; and the subscript $|_z$ means at any height of the column, i.e., $0 \leq z \leq h$.

In this process both the film heat and mass transfer coefficients are important in establishing the overall effective heat transfer coefficient, U. For simultaneous heat and mass transfer operations involving air and water, the Lewis Number is essentially unity allowing the coefficients to be related by similitude as $k_y = h_g/c_p$, as described in McCabe et al., *Unit Operations of Chemical Engineering*, 5th ed., McGraw-Hill, Inc. (1993). The effect of the latent energy associated with the mass transfer of water vapor can be related to the sensible heat transfer associated with the air/vapor mixture by equation 9, as described by Werling, *Design and Experimental Operation of a Times-Two Liquid Desiccant Regeneration System*. M S Thesis, Arizona State University (1990), which is incorporated herein by reference in its entirety:

$$h_f|_z = h_g|_z \cdot (1 + M|_z) \tag{9}$$

where $h_f|_z$ is the film heat transfer coefficient; $h_g|_z$ is the film heat transfer coefficient established by gas movement; and M is expressed as:

$$M = \left(\frac{\lambda}{RT}\right)^2 \cdot \left(\frac{R}{c_p}\right) \cdot V \tag{10}$$

where $\lambda$ is the heat of vaporization of the separable component (J/mole); and $c_p$ is the gas phase heat capacity.

Taking into account both gas film heat transfer coefficients and the thermal resistance of the heat transfer wall, the overall effective heat transfer coefficient, U, can be expressed as:

$$\frac{1}{U|_z} = \frac{1}{h_{fe}|_z} + \frac{1}{h_{fd}|_z} + \frac{t}{k} \tag{11}$$

where $h_{fe}|_z$ is the film heat transfer coefficient on the evaporation side; $h_{fd}|_z$ is the film heat transfer coefficient on the dew-formation side; t is the thickness of the heat-transfer wall (m); and k is the thermal conductivity of the heat transfer wall (watts/m·K). The heat transferred (q in watts) through the heat transfer wall, is essentially the latent heat ($\lambda$) needed to evaporate water as:

$$q|_z = G \cdot \lambda \cdot (V_e|_{z+\Delta z} - V_e|_z) \tag{12}$$

The area needed for the heat transfer wall is obtained by energy balance of equation 13, as described in Bird et al., *Transport Phenomena*, John Wiley and Sons, Inc. (1960).

$$\frac{A|_z}{q|_z} = \frac{1}{U|_z} \cdot \frac{1}{\Delta T_{LM}|_z} \tag{13}$$

where $\Delta T_{LM} = T_{yd} - T_{ye}$. (14)

Upon integration over all areas and assuming that t/k is small compared to the gas phase resistance, equation 15 then relates the total energy reuse factor, f, and the total production flux, $P_f$ as follows:

$$f \cdot P_f = \left\{\left[\frac{\lambda}{B \cdot R \cdot T}\right]^2 \cdot \left[\frac{h_g}{c_p}\right]\right\} \cdot \left(\frac{V_{eh}}{2+V_{eh}}\right) \cdot \left(\frac{3600}{1000}\right) \cdot F_{RH} \tag{15}$$

Figure 5:
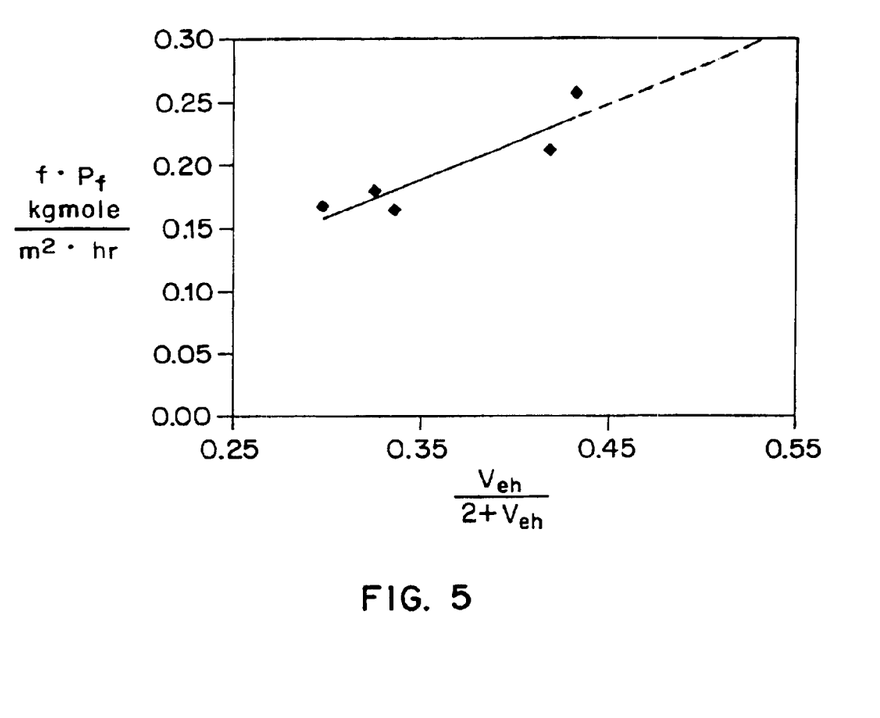
FIG. 5 is a graph of brackish water desalination data.

Equation 15 shows that as the temperature increases the product of energy reuse factor and molar production flux become greater. It is also apparent that the energy reuse factor, f, and the molar production flux, $P_f$, are essentially related hyperbolically in a specified unit. With the hottest temperature held constant, the production flux must reduce with increases in energy reuse factor and vice-a-versa. Additionally, higher values of $V_{eh}$, i.e. higher temperatures, improve both f and $P_f$ values, which is economically beneficial to the tower. However, higher temperatures are limited to the heat source temperature and the normal boiling point of water or the separable component. FIG. 5 provides an illustration of the product of the production density and energy reuse factor as a function of $V_e/(2+V_e)$.

A theoretical model was developed based on energy and material shell balances. Model assumptions included: constant heat of vaporization, liquid film temperature is the average temperature of the gas phases, and feed temperature offset is set to be 5° F. with respect to gas phase temperature of the evaporating side. The inlet and outlet streams are provided in FIG. 1.

In general the steady state energy balance is given by equation 16:

$$\sum_{\text{all components}} \dot{n}_{in} \cdot \underline{h}_{in} - \sum_{\text{all components}} \dot{n}_{out} \cdot \underline{h}_{out} + Q = 0 \tag{16}$$

where n is the molar flow rate (gmole/sec); and h is the molar enthalpy (J/mole). Starting with shell balances for the energy on the evaporation side and the dew-formation side, two ordinary differential equations can be obtained. These equations describe the temperature as a function of height (or area) on each side of the tower. After algebraic manipulation, the two differential equations become:

$$\frac{d}{dA}(T_{ye}) = -\left[\frac{1}{w}\right] \cdot \left[\frac{Evap2 \cdot Dew3 + Evap3 \cdot Dew1}{Evap1 \cdot Dew1 - Evap2 \cdot Dew2}\right] \tag{17a}$$

$$\frac{d}{dA}(T_{yd}) = -\left[\frac{1}{w}\right] \cdot \left[\frac{Evap3 \cdot Dew2 + Evap1 \cdot Dew3}{Evap1 \cdot Dew1 - Evap2 \cdot Dew2}\right] \tag{17b}$$

where $$Evap1 = \begin{cases} -c_{Pwater} \cdot (T_{xe} - T_{ref}) \cdot G_e \cdot \beta_e - \frac{L_e \cdot (T_{xe} - T_{ref}) \cdot \alpha_{water}}{2} - \frac{L_e \cdot c_{Pwater}}{2} + \\ G_e \cdot c_{Pvapor}(T_{ye} - T_{ref}) \cdot \beta_e + G_e \cdot V_e \cdot (T_{ye} - T_{ref}) \cdot \alpha_{vapor} + G_e \cdot V_e \cdot c_{Pvapor} + \\ G_e \cdot c_{Pair} + G_e \lambda \cdot \beta_e + F \cdot (T_F - T_{ref}) \cdot \alpha_{Feed} + F \cdot c_{PFeed} + G_e \cdot (T_{ye} - T_{ref}) \cdot \alpha_{air} \end{cases};$$

$$Evap2 = \left\{\frac{L_e \cdot (T_{xe} T_{ref}) \cdot \alpha_{water}}{2} + \frac{L_e \cdot c_{Pwater}}{2}\right\};$$

$$Evap3 = \{q \cdot w\};$$

$$Dew1 = \begin{cases} -c_{Pwater} \cdot (T_{xd} - T_{ref}) \cdot G_d \cdot \beta_d - \frac{L_d \cdot (T_{xd} - T_{ref}) \cdot \alpha_{water}}{2} + \frac{L_d \cdot c_{Pwater}}{2} + \\ G_d \cdot c_{Pvapor}(T_{yd} - T_{ref}) \cdot \beta_d + G_d \cdot V_d \cdot (T_{yd} - T_{ref}) \cdot \alpha_{vapor} + \\ G_d \cdot V_d \cdot c_{Pvapor} + G_d \cdot (T_{yd} - T_{ref}) \cdot \alpha_{air} + G_d \cdot c_{Pair} \cdot G_d \cdot \lambda \beta_d. \end{cases};$$

$$Dew2 = \left\{\frac{-L_d \cdot (T_{xd} - T_{ref}) \cdot \alpha_{water}}{2} - \frac{L_d \cdot c_{Pwater}}{2}\right\}; \text{ and}$$

$$Dew3 = \{q \cdot w\}.$$

A computer code was written to solve numerically the system of equations (17a and 17b) based on $4^{th}$ order Runge-Kutta method. The computer program also employs mass balances between the liquid film on the heat transfer wall and the carrier gas in the evaporation chamber and in the dew-formation chamber to provide a model of the other process variables. The material balance for the evaporation side is provided by equation 18 below for a particular height z:

$$L_e \cdot x_e|_{z+\Delta z} + G_e \cdot V_e|_z + F \cdot x_F|_z = L_e \cdot x_e|_z + G_e \cdot V_e|_{z+\Delta z} + F \cdot x_F|_{z+\Delta z} \quad (18)$$

wherein, $L_e$, is the liquid flow rate; $X_e$ is the concentration of water; $G_e$ is the gas flow rate; $V_e$ is mole of water vapor/mole of gas; F is the feed rate; and $x_F$ is the concentration of water in the feed. Dividing by $\Delta z$, taking the limit, and integrating between the top of the tower and z provides equations 19a and 19b:

$$x_e = \frac{F \cdot x_F - G_e \cdot (V_{eh} - V_e)}{F - Ge \cdot (V_{eh} - V_e)}. \quad (19b)$$

The material balance for the dew-formation side is provided by equation 20 below for a particular height z:

$$L_d \cdot x_d|_{z+\Delta z} + G_d \cdot V_d|_{z+\Delta z} = L_d \cdot x_d|_z + G_d \cdot V_d|_z \quad (20)$$

wherein $L_d$ is the liquid flow rate; $x_d$ is the concentration of water; $G_d$ is the gas flow rate; $V_d$ is mole of water vapor/mole of gas. Dividing by $\Delta z$, taking the limit, and integrating between the top of the tower and z provides equations 21 a and 21 b:

$$L_d = G_d \cdot (V_{dh} - V_d) \quad (21a)$$

$$x_d = 1 \quad (21b)$$

Figure 6:
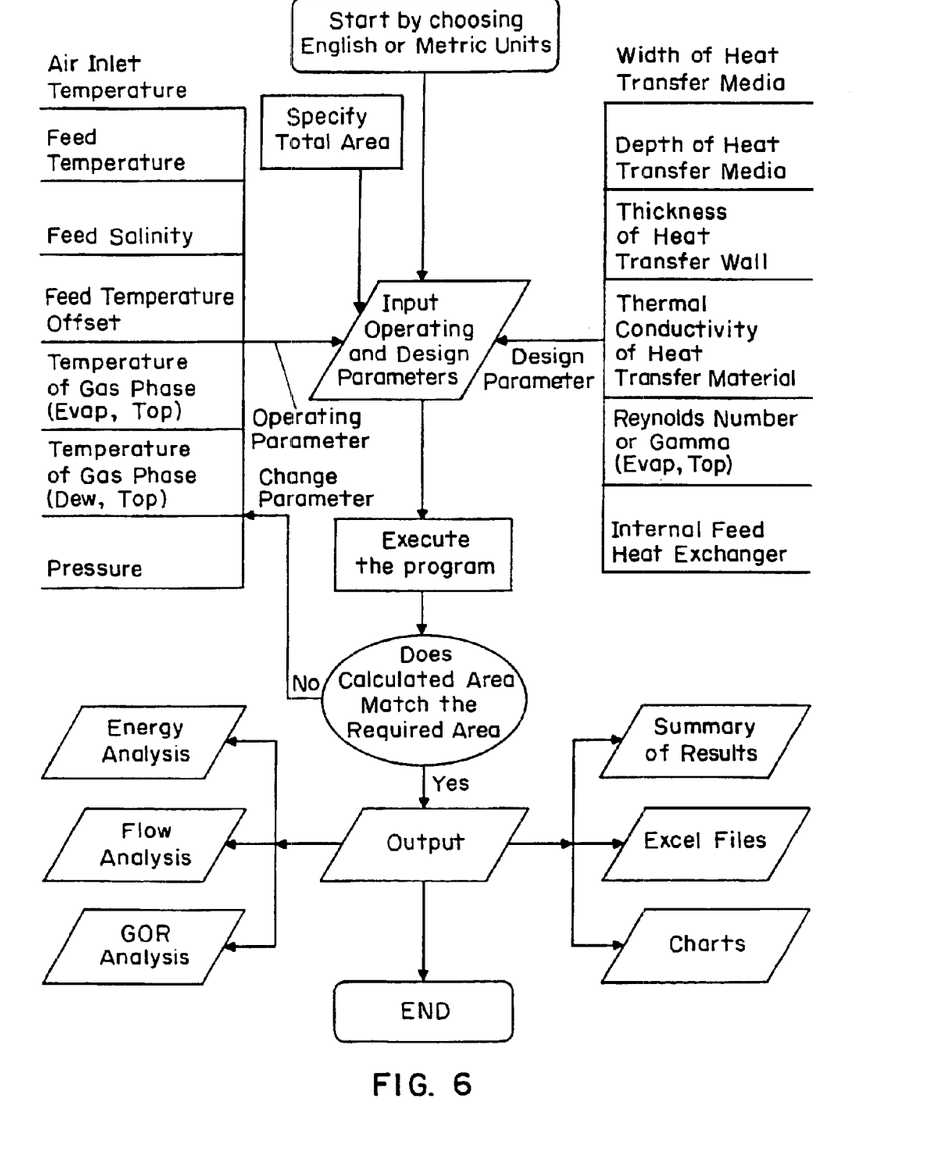
FIG. 6 is a flow chart of computer program that emulates the processes occurring in the apparatus of the present invention.

A flow chart of the computer program is provided in FIG. 6. The model predicts the following: temperature profile on the evaporation side and the dewformation side, salinity as a function of height, liquid traffic on each side of the tower and their temperatures as a function of height and the total area of the tower required to obtain the desired parameters.

EXAMPLES

These examples further describe and demonstrate embodiments within the scope of the present invention. The examples are given solely for the purpose of illustration and are not to be construed as limitations of the present invention, as many variations thereof are possible without departing from the spirit and scope of the invention.

Common variable used herein and their corresponding definitions are provided below in Table 1.

TABLE 1

Nomenclature Chart

| Variable* | Definition |
| --- | --- |
| A | Heat transfer area (m²) |
| $c_p$ | Heat capacity (J/mol.K) |
| F | Feed flow rate (gmole/sec) |
| FB | Brine flow rate (gmole/sec) |
| FD | Distillate flow rate (gmole/sec) |
| G | Carrier gas flow rate (gmole/sec) |
| ΔG | Carrier gas bleed flow rate (mole/sec) |
| h | Molar enthalpy (J/mol) |
| k | Thermal conductivity (W/m.K) |

TABLE 1-continued

Nomenclature Chart

| Variable* | Definition |
| --- | --- |
| L | Liquid flow rate at any position in the tower |
| n | Molar flow rate (gmole/sec) |
| P | Total pressure (bar) |
| $P°_w$ | Vapor pressure of water (bar) |
| Q | Energy input at the top of the tower (J/sec) |
| q | Heat flux (W/m²) |
| R | Gas constant (J/mol.K) |
| RH | Relative Humidity (fraction) |
| T | Temperature (K) |
| t | Thickness of heat transfer wall (m) |
| U | Overall heat transfer coefficient (W/m².K) |
| V | moles of water vapor per moles of carrier gas |
| w | Width of the heat transfer wall (m) |
| $X_B$ | mole fraction of water in the brine stream |
| $X_D$ | mole fraction of water in the distillate stream |
| λ | Heat of vaporization of water (J/mol) |
| α | Derivative function of heat capacity |
| β | Derivative function of absolute Humidity ratio (V) |

*wherein subscripts

"d" means dew-formation portion of the column

"e" means evaporation portion of the column

"b" means top of the tower

"0" means bottom of the tower

"xe" means liquid phase on the evaporation portion of the column

"xd" means liquid phase on the dew-formation portion of the column

"ye" means gas phase on the evaporation portion of the column

"yd" means gas phase on the dew-formation portion of the column

Example 1

The Dewvaporation apparatus of the present invention avoids the use of multiple pumps effectively by letting gravity produce the liquid movement. A laboratory bench scale tower containing an effective total heat transfer area of 20 ft² (1.8 m²) was built. The height of the tower was 8 feet (2.44 m) and 6 inches (15.24 cm) wide. The heat transfer wall was made of plastic sheets (75 microns thick) with ¼ inch spacing between the heat transfer wall and the outer wall of the apparatus. The shell of the apparatus was made of twin wall polycarbonate plastic sheets (commercially available as Lexanthermoclear sheet twin wall ¼ inch sheets from the Structural Products Division of General Electric Company) to give support for the apparatus. The outside of the apparatus was further covered with polystyrene foam to provide insulation. Initial data were conducted using brackish water having 850 ppm TDS, as shown in Table 2.

TABLE 2

Energy Reuse Factor and Production Density Data

| Temperature* | | | | | Distillate | | $P_f$ | $fP_f$ |
|---|---|---|---|---|---|---|---|---|
| °F. | °C. | $V_e$ | $\frac{V_e}{2+V_e}$ | f | lb/hr | Kg/hr | Kgmole/m² · hr | Kgmole/m² · hr |
| 175 | 79.44 | 0.8477 | 0.2977 | 4.6 | 3.43 | 1.21 | 0.0363 | 0.1685 |
| 178 | 81.11 | 0.9676 | 0.3260 | 7.7 | 2.23 | 0.79 | 0.0236 | 0.1804 |
| 179 | 81.67 | 1.0129 | 0.3362 | 7.9 | 1.98 | 0.70 | 0.0209 | 0.1658 |
| 186 | 85.56 | 1.4385 | 0.4184 | 9.5 | 2.13 | 0.75 | 0.0225 | 0.2131 |
| 187 | 86.11 | 1.5208 | 0.4319 | 11.4 | 2.14 | 0.76 | 0.0226 | 0.2590 |

*temperature at the top of the evaporation chamber

FIG. 5 illustrates the relationship between the product of energy reuse factor and production density and the $V_e$ ratio ($V_e/(2+V_e)$) as obtained from equation 1. The dashed line represents extrapolation to a factor of 15. Based on FIG. 5, a factor of 15 can be obtained for a temperature of 193° F. (89.6° C.). Experiments at that temperature were not conducted due to heat transfer equipment limitation.

Example 2

Scaling Experiments

The scaling experiments were carried out on a bench scale unit, which consisted of a thermal control grill mounted vertically with a sample of a plastic heat transfer sheet attached to its surface.

The unit was covered with a plastic wall allowing the air to rise in temperature in order to simulate the operation of the tower. Salt solution was prepared according to ASTM method number D1141-90 (1992) with a salinity of 35 g/Kg. Moreover, temperatures of the liquid film were measured along the center of the wall using thermocouples.

Results showed that after 82% to 85% recovery of water, solids were observed. However, the solids were washed down the plastic wall without adhering to it. The Dewvaporation process concentrates salt solution from 3.5 wt % to 10 wt % which is 67% water recovery, so potential scaling does not appear to be a dominant factor in this process.

Example 3

1000 gal/day (4 m³/day) Desalination Facility

Figure 7:
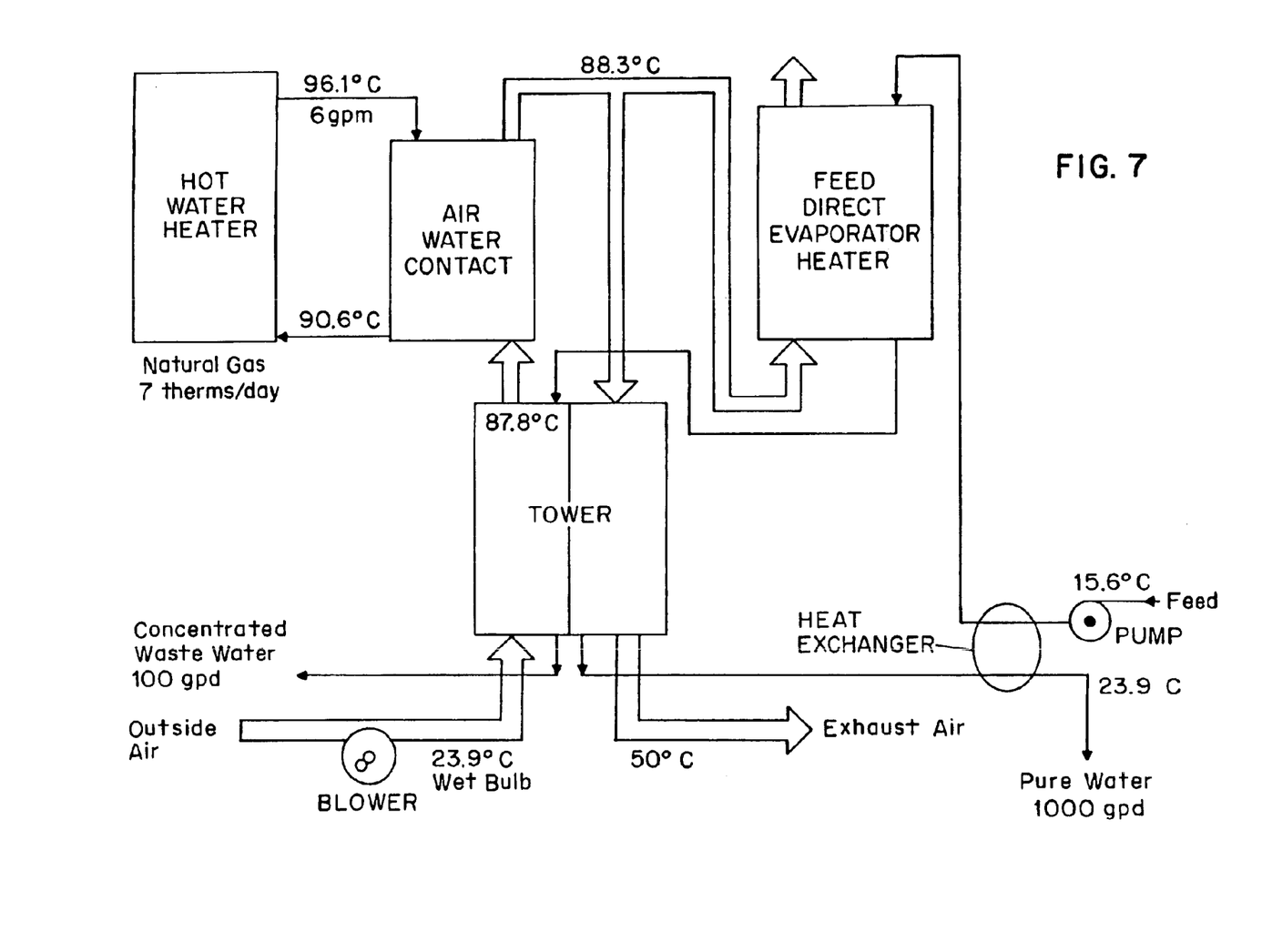
FIG. 7 is a schematic of another embodiment of the present invention.

The basis for a cost estimation is a 1000 gal/day brackish water unit (FIG. 7) with a factor f=15. The capital charge factor 0.12 was based on the current prime interest rate of 8.5% and an equipment life of 15 years (Table 3). The feed may contain up to 8000 ppm TDS resulting in a condensate of less than 1 ppm TDS.

TABLE 3

Cost Summary of 1000 gal/day unit

| | |
|---|---|
| Plastic heat transfer wall (4400 ft²*$0.096/ft²) | $425 |
| Cover | $100 |
| 4 pumps (feed liquid and hot water recycle) | $250 |
| 1 air fan | $44 |
| 1 hot water, 80% efficiency | $485 |
| Pipes and fittings | $100 |
| Assembly (2 workers at $10/hr for 8 hrs) | $160 |
| Total manufacturing cost | $1,564 |

TABLE 3-continued

Cost Summary of 1000 gal/day unit

| | |
|---|---|
| Manufactures gross margin | $500 |
| Total Unit Cost | 2064* |

*$2.06/gallon day or $0.52/cubic meter day

The major elements of the equipment costs are the plastic heat transfer wall and the hot water heater. Each of which accounts for about 30% of the manufacturing cost. A reduction in the size of the heat transfer wall can be achieved by higher operating temperature and improvements in the heat transfer coefficient. These effects are being investigated in the laboratory. Also, the cost of the water beater per 1000 gallons production reduces with larger size desalination plants.

Operating cost consists of natural gas consumption of 0.29 therms (80% efficient heater) at a cost of $0.50/therm or $3.50 day. The electrical cost consists of four pumps and one air fan at $0.08/kWh ($0.74/day for electricity). The capital recovery charge is $2064*0.12 or $0.68/day. The cost of chemicals were estimated based on multi-effect evaporation at $0.25/day. Maintenance is assumed to be a one hour check per month to the facility at $10/hr or $0.33/day. Therefore, the total daily cost of operations is projected to be $5.50/day. Since the basis of this calculation was 1000 gal/day production, then the production cost on a gallon basis is $0.006/gallon.

By inspection, the most significant operation cost is the expenditure for natural gas, which represents ⅔of the total. Natural gas usage can be reduced by increases in heat transfer wall area (and thus wall costs), operating temperatures, and coefficients.

Example 4

Anti-gelling Experiments for Chemical Mechanical Polishing Water

The process of chemical mechanical polishing (CMP) is extensively used in the silicon industry, and vast quantities of CMP aqueous slurries are discharged. These CMP slurries typically contain about 3–15% by weight of metal oxide particles having an average diameter of less than about 1 micron. However, CMP water slurries tend to form gels, which can create inefficiencies in the Dewvaporation appa ratus of the present invention. As a result, CMP gel formation was studied in the present example.

CMP water slurries were warmed to evaporate (not boil) water into air at different temperatures at about atmospheric pressure. Table 4 provides the resulting gel forming temperatures as a function of slurry suspended solids content containing no PVA.

TABLE 4

CMP Slurry Gel Formation Gel Temperatures

| Slurry concentration (% by wt. solids) | Gel Temperature (° C.) |
|---|---|
| 20% | 50 |
| 18.75% | 55 |
| 16.50% | 59 |
| 15% | 60 |
| 10% | 70 |
| 6% | 75 |
| 5% | 80 |
| 3.75% | 85 |

Typically, slurries start at about 15 weight % silicon dioxide and are diluted to from about 3% to about 5% by weight in order to keep the polishing tool clean. Solutions in this concentration range (3–5% by weight) form gels at about 85° C. (185° F.), as provided in Table 4 above. However, as the slurry dehydrates, the solids concentration tend to increase to about 15% by weight, with the corresponding gel formation temperature decreasing to about 60° C. (140° F.), as provided in Table 4. The formation of gels in the Dewvaporation apparatus can reduce the heat transfer capability and form plugs, which can restrict liquid and gas flows.

It was discovered that the addition of an anti-gellant helped to increase the temperature at which gels formed. One particular anti-gellant, polyvinyl alcohol (PVA) was especially effective in CMP slurries. Adding PVA to the slurry prior to evaporation increased the gel formation temperature, as provided in Table 5. The general trend of the data shows that as the amount of PVA added was increased from 0 to 3.5 grams/liter, the result was an increase in the gel formation temperature from 60° C. (140° F.) to 90° C. (194° F.). The ability to achieve these higher temperatures allows the Dewvaporation apparatus to operate as efficiently as in the case of water desalination.

TABLE 5

The Effect of PVA on Gel Formation Temperatures For 15% by Weight CMP Slurries

| Concentration (% by wt. solids) | PVA added (grams/liter) | Gel Temperature (° C.) (degrees C.) |
|---|---|---|
| 15% | 0 | 60 |
| 15% | 1.0 | 80 |
| 15% | 1.8 | 85 |
| 15% | 3.5 | 90 |

Table 6 shows the effect of about 5 grams/liter of PVA in varying slurry concentrations. In general it is observed that the addition of 5 grams/liter PVA to CMP slurries increases the gel formation temperature by about 20° C. (36° F.). This increase in gel formation temperatures protects the Dewvaporation apparatus from gel damage and allows the towers to efficiently process CMP liquid dehydration at normal tower temperatures of up to about 85° C.

TABLE 6

The Effect of PVA on Gel Formation Temperatures for Various Slurry Concentrations

| Concentration (% by wt. solids) | PVA (grams/liter) | Gel Temperature (° C.) |
|---|---|---|
| 15% | 5.0 | 90 |
| 10% | 5.3 | 95 |
| 5% | 5.4 | 100 |

A typical operation can involve the dehydration of a 5 weight % CMP slurry to 15 weight % slurry in a Dewvaporation Tower. The final dehydration of the 15 weight % slurry can be accomplished in a scraped wall heat exchanger. The steam from the heat exchanger can be used to satisfy the tower energy needs. The solids from the heat exchanger would contain CMP solids and PVA solids. The PVA can be separated, re-dissolved in water and re-used. The CMP solids do not re-dissolve and can be separated for disposal by any known method, such as filtering.

It should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the appended claims.

What is claimed is:

1. A continuous contacting apparatus for separating a liquid component from a liquid mixture, the apparatus comprising:
    an evaporation chamber having first and second ends, an inlet and an outlet for a carrier gas, and an inlet and an outlet for a liquid mixture, wherein the inlet for the liquid mixture and the outlet of the carrier gas are located on the first end of the evaporation chamber;
    a dew-formation chamber having an inlet and an outlet for a carrier gas, and an outlet for the separable liquid component, wherein the inlet for the carrier gas of the dew-formation chamber is situated in a countercurrent manner to the inlet for the carrier gas of the evaporation chamber;
    a common heat transfer wall in continuous contact with the liquid mixture, wherein the heat transfer wall is adjacent the evaporation chamber and the dew-formation chamber and is capable of providing thermal communication between the evaporation chamber and the dew-formation chamber; and
    a heating apparatus for heating the carrier gas from the outlet of the evaporation chamber, wherein the heated carrier gas is directed to flow into the inlet of the dew-formation chamber;
    wherein the apparatus provides a condensate production flux from about 0.045 to about 2.27 kg of condensate per hour/$^2$ of heat transfer wall.

2. The apparatus according to claim 1 further comprising,
    a feeding device for providing the liquid mixture onto the evaporation chamber side of said heat transfer wall; and
    an air mover for providing a flow of a carrier gas through the chambers, wherein the gas flow in the evaporation chamber is countercurrent to the gas flow in the dew-formation chamber.

3. The apparatus according to claim 1, further comprising a wetting material placed on the evaporation chamber side of the heat transfer wall.

4. The apparatus according to claim 1, wherein the heating apparatus is a boiler, which provides steam to the carrier gas.

5. The apparatus according to claim 1, wherein the heating apparatus is a heat exchanger, wherein steam from a boiler is brought into thermal communication with the carrier gas.

6. The apparatus according to claim 1, wherein the heating apparatus is a desiccant heat exchanger, wherein a slip stream is taken from the carrier gas and reacted with a desiccant and the heat produced by the reaction is thermally communicated to the remainder of the carrier gas.

7. The apparatus according to claim 6, wherein the desiccant is selected from the group consisting of lithium bromide, calcium chloride, lithium chloride, and mixtures thereof.

8. The apparatus according to claim 1, wherein the heating apparatus is a liquid-gas contactor, wherein a reactant reacts with the carrier gas, thereby increasing the concentration of the separable liquid component in the remaining carrier gas.

9. The apparatus according to claim 8, wherein the carrier gas and reactant are respectively selected from the group consisting of carbon dioxide carrier gas and potassium carbonate reactant; carbon dioxide carrier gas and monoethanol amine reactant; butane carrier gas and oil reactant; sulfur dioxide carrier gas and monoethanol amine reactant; and carbon monoxide carrier gas and copper ammonia acetate reactant.

10. The apparatus according to claim 1, further comprising a plurality of spacers placed in each chamber.

11. The apparatus according to claim 10, wherein the plurality of spacers are positioned to provide a serpentine-shaped channel for the carrier gas.

12. The apparatus according to claim 11, further comprising airflow guides.

13. The apparatus according to claim 1, wherein one or more of the chambers further comprises a filler.

14. The apparatus according to claim 1, wherein the liquid mixture further comprises an anti-gellant or an anti-flocculant.

15. The apparatus according to claim 14, wherein the anti-gellant or anti-flocculant is selected from the group consisting of polyvinyl alcohol, carboxymethyl cellulose, and mixtures thereof.

16. A process for separating a liquid component from a liquid mixture in a continuous contacting manner, the process comprising:

providing a heat transfer wall having an evaporation side and a dew-formation side;

continuous contacting the liquid mixture with the evaporation side of the heat transfer wall;

flowing a carrier gas across the evaporation side of the heat transfer wall to provide a carrier gas saturated with the separable liquid component;

heating the saturated carrier gas; and flowing the heated saturated carrier gas across the dew-formation side of the heat transfer wall to provide condensation of the separable liquid component from the heated saturated carrier gas;

wherein the condensation of the separable liquid component is provided at a condensate production flux of from about 0.045 to about 2.27 kg of condensate per hour/$m^2$ of heat transfer wall.

17. The process according to claim 16, wherein the flow of the carrier gas across the evaporation side of the heat transfer wall is countercurrent to the flow of the carrier gas across the dew-formation side of the heat transfer wall.

18. The process according to claim 16, wherein the evaporation side of the heat transfer wall further comprises a wetting material placed on the wall.

19. The process according to claim 16, wherein the saturated gas is heated by a method selected from the group consisting of adding steam; gas-liquid contacting with a hot water stream; heat exchanging with a higher temperature stream; heat exchanging with a slip carrier gas stream that is brought into contact with a desiccant; and reacting the carrier gas with a reactant.

20. The process according to claim 16, further comprising adding an anti-gellant or a anti-flocculant to said liquid mixture before contacting the liquid mixture with the evaporation side of the heat transfer wall.

21. The process according to claim 16, wherein said anti-gellant or anti-flocculant is selected from the group consisting of polyvinyl alcohol, carboxymethyl cellulose, and mixtures thereof.

* * * * *